United States Patent
Steiss et al.

(10) Patent No.: US 6,895,494 B1
(45) Date of Patent: May 17, 2005

(54) SUB-PIPELINED AND PIPELINED EXECUTION IN A VLIW

(75) Inventors: Donald E. Steiss, Richardson, TX (US); Laurence Ray Simar, Jr., Richmond, VA (US)

(73) Assignee: Texas Instruments Incorporated, Dallas, TX (US)

( * ) Notice: Subject to any disclaimer, the term of this patent is extended or adjusted under 35 U.S.C. 154(b) by 527 days.

(21) Appl. No.: 09/603,226

(22) Filed: Jun. 26, 2000

(51) Int. Cl.[7] .................................... G06F 15/00
(52) U.S. Cl. .............................. 712/24; 712/209
(58) Field of Search .................. 712/24, 204, 206, 712/209

(56) References Cited

U.S. PATENT DOCUMENTS

| | | | | |
|---|---|---|---|---|
| 5,638,525 A | * | 6/1997 | Hammond et al. | 712/209 |
| 5,774,686 A | * | 6/1998 | Hammond et al. | 712/209 |
| 5,848,288 A | * | 12/1998 | O'Connor | 712/24 |
| 5,884,057 A | | 3/1999 | Blomgren et al. | |
| 5,961,632 A | * | 10/1999 | Shiell et al. | 712/212 |
| 6,401,190 B1 | * | 6/2002 | Nishioka et al. | 712/24 |
| 6,415,376 B1 | * | 7/2002 | Mohamed et al. | 712/24 |
| 6,615,338 B1 | * | 9/2003 | Tremblay et al. | 712/24 |

FOREIGN PATENT DOCUMENTS

| | | |
|---|---|---|
| EP | 0 709 767 A | 5/1996 |
| EP | 1 050 799 A | 11/2000 |
| WO | WO 00 33178 A | 6/2000 |

OTHER PUBLICATIONS

Hennessy, John L. and Patterson, David A. Computer Architecture: A Quantitative Approach. Second Edition. San Francisco, CA: Morgan Jaufmann Publishers, Inc. ©1996. pp. 278 and 284–289.*

IBM Research Report, Kemal Ebcioglu, Erik R. Altman, "DAISY: Dynamic Compilation for 100% Architectural Compatibility," Aug. 5, 1996, 82 pages.

IEEE, B. Ramakrishna Rau, "Dynamically Scheduled VLIW Processors," 1993, Hewlett–Packard Laboratories, pp. 80–92.

(Continued)

*Primary Examiner*—Eddie Chan
*Assistant Examiner*—Aimee J. Li
(74) *Attorney, Agent, or Firm*—Robert D. Marshall, Jr.; W. James Brady, III; Frederick J. Telecky, Jr.

(57) ABSTRACT

A subpipelined translation embodiment provides binary compatibility between current an future generations of DSPs. When retrieved from memory an entire fetch packet is assigned an operating mode (base instruction set or migrant instruction set) according to the current execution mode. The fetch packets from the instruction memory are parsed into execute packets and sorted by execution unit (dispatched) in a datapath shared by both execution modes (base and migrant). The two execution modes have separate control logic. Instructions from the dispatch datapath are decoded by either base architecture decode logic or the migrant architecture decode logic, depending on the execution mode bound to the parent fetch packet. Code processed by the migrant and base decode pipelines produces machine words that are selected by a multiplexer. The multiplexer is controlled by the operating mode bound to the fetch packet that produced the machine word. The selected machine word controls a global register file, which supplies operands to all hardware execution units and accepts results of all hardware execution units.

30 Claims, 1 Drawing Sheet

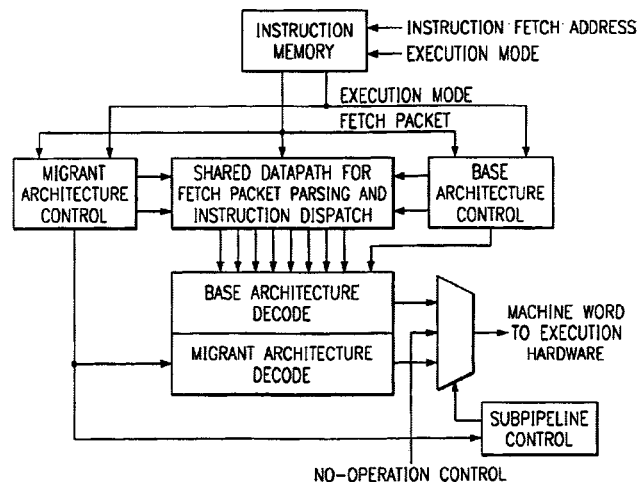

OTHER PUBLICATIONS

IEEE, Thomas M. Conte, Sumedh W. Sathaye, Sanjeev Banerjia, "A Persistent Rescheduled–Page Cache for Low Overhead Object Code Compatibility in VLIW Architectures," 1996, Department of Electrical and Computer Engineering North Carolina State University, pp. 4–13.

Digital Technical Journal, Raymond J. Hookway, Mark A. Herdeg, "Digital FX!32: Combining Emulation and Binary Translation," Aug. 28, 1997, 21 pages.

Digital Technical journal, vol. 4, Special Issue 1992, "Binary Translation," 33 pages.

Proposal, Don Steiss, Jan. 26, 1999, 4 pages.

C6x Offline Binary Translation with Run Time Assistance, Donald Steiss, Jun. 10, 1998, 15 pages.

* cited by examiner

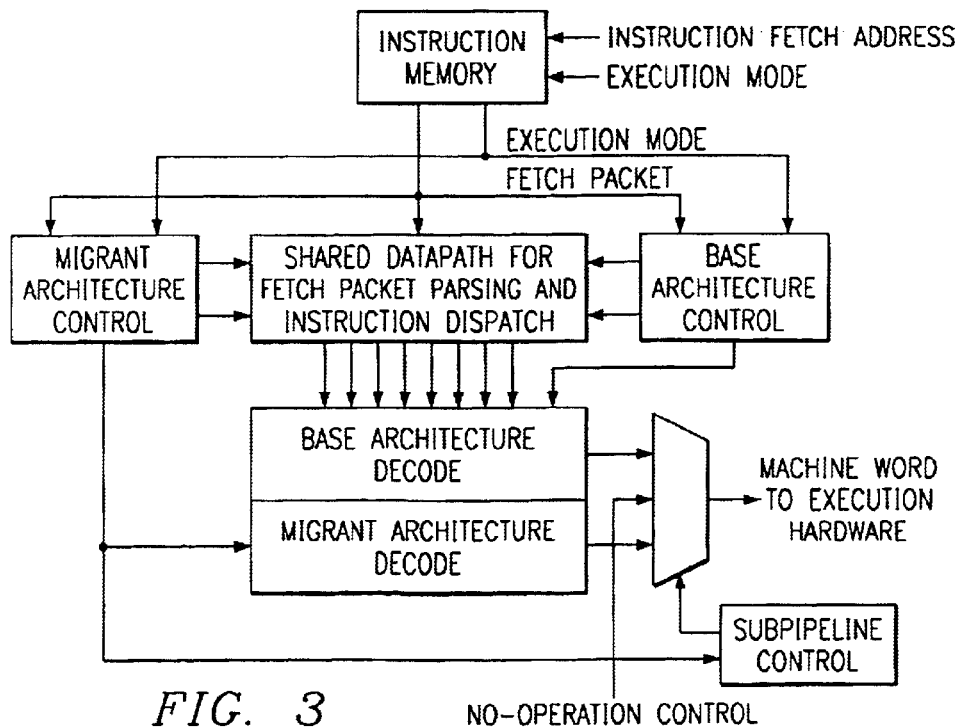

```
migrant: 1    mul a2, a3, a4
           || and a1, a2, a4
migrant: 2    mul a2, a3, a4
           || or a4, a5, a6
migrant: 3    add a4, a1, a1
           || mul a2, a3, a4
migrant: 4    add a4, a1, a1
           || mul a2, a3, a4
migrant: 5    add a4, a1, a1
           || mul a2, a3, a4
```

*FIG. 1*

```
base:  1     mul r2, r3, r4
          || and r1, r2, r4
base:  2     NOP ; inserted NOP
base:  3     NOP ; inserted NOP
base:  4     NOP ; inserted NOP
base:  5     mul r2, r3, r4
          || or r4, r5, r6
base:  6     NOP
base:  7     NOP
base:  8     NOP
base:  9     add r4, r1, r1
          || mul r2, r3, r4
base: 10     NOP
base: 11     NOP
base: 12     NOP
base: 13     add r4, r1, r1
          || mul r2, r3, r4
base: 14     NOP
base: 15     NOP
base: 16     NOP
base: 17     add r4, r1, r1
          || mul r2, r3, r4
base: 18     NOP
base: 19     NOP
base: 20     NOP
```

SUB-PIPELINED AND PIPELINED EXECUTION IN A VLIW

FIELD OF THE INVENTION

This invention relates in general to instruction set architectures and more specifically to sub-pipelined and pipelined instruction execution in a VLIW.

BACKGROUND OF THE INVENTION

Traditionally, Very Long Instruction Word (VLIW) processors have been defined by the following set of attributes. These processors have the ability to specify multiple, independent operations in each instruction (a MultiOp instruction.) VLIW architectures are horizontal machines, with each wide instruction-word or MultiOp, consisting of several operations or, Ops. All Ops in a MultiOp are issued in the same execution schedule. Programs that assume specific non-unit latencies for the operations and which, in fact, are only correct when those assumptions are true. The requirement for static, compile-time operation scheduling takes into account operation latencies and resource availability. Consequently, the hardware must conform exactly to the assumptions built into the program with regards to the number of functional units and the operation latencies. VLIW processors typically lack any interlock hardware, despite the fact that multiple, pipelined operations are being issued every cycle.

The original attraction of this style of architecture is its ability to exploit large amounts of instruction-level parallelism (ILP) with relatively simple and inexpensive control hardware. Whereas a number of VLIW products have been built which are capable of issuing six or more operations per cycle, it has just not proven feasible to build superscalar products with this level of ILP. Furthermore, the complete exposure to the compiler of the available hardware resources and the exact operation latencies permits highly optimized) schedules.

These very same properties have also led to the perception that VLIW processors are of limited interest as products. The rigid assumptions built into the program about the hardware are viewed as precluding object code compatibility between processors built at different times with different technologies and, therefore, having different latencies. Even in the context of a single processor, the need for the compiler to schedule to a latency, that is fixed at compile-time, is problematic with operations such as loads which can have high variability in their latency depending on whether a cache hit or miss occurs. Because of this latter problem, VLIW products have rarely adhered to the ideal of no interlock hardware, whatsoever. Alternatively, with an implementation of a VLIW architecture, interlocking and stalling of the processor is common when a load takes longer than expected.

The conventional wisdom is that dynamic scheduling is inapplicable to VLIW processors. A first step towards understanding how to perform dynamic scheduling on VLIW processors is to recognize the distinction between traditional VLIW processors and the concept of a VLIW architecture. A VLIW processor is defined by a specific set of resources (functional units, buses, etc.) and specific execution latencies with which the various operations are executed. If a program for a VLIW processor is compiled and scheduled assuming precisely those resources and latencies, it can be executed on that processor in an instruction-level parallel fashion without any special control logic. Conversely, a VLIW processor that has no special control logic can only correctly execute those programs that are compiled with the correct resource and latency assumptions. VLIW processors have traditionally been built with no special control logic and this has led to the conclusion that VLIW processors must necessarily be designed in this fashion.

A different view of VLIW is as an architecture, i.e., a contractual interface between the class of programs that are written for the architecture and the set of processor Implementations of that architecture. The usual view is that this contract is concerned with the instruction format and the interpretation of the bits that constitute an instruction. But the contract goes further and it is these aspects of the contract that are of primary importance in this patent. First, via its MultiOp capability, a VLIW architecture specifies a set of operations that are guaranteed to be mutually independent (and which, therefore, may be issued simultaneously without any checks being made by the issue hardware).

Second, via assertions about the operation latencies, an architecture specifies how a program is to be interpreted if one is to correctly understand the dependencies between operations. In the case of a sequential architecture, most latencies are assumed by the programmer to be a single cycle. So, the input operands for an operation must appear to that programmer to be determined by all the operations that were issued (and, in most cases, completed) before the operation in question. This is true because there are some sequential architectures, SPARC for example, where some instructions (branches with delay slots) have non-unit latencies.

In the case of programs for VLIW architectures, with operations having non-unit latencies, the input operands for an operation are not determined by all the operations that were issued before the operation in question. What matters is the operations that are supposed to have completed before the issuance of the operation in question. Operations that were issued earlier, but which are not supposed to have completed as yet, do not impose a flow dependence upon the operation in question.

A program has unit assumed latencies (UAL) if the semantics of the program are correctly understood by assuming that all operations in one instruction complete before the next instruction is issued. A program has non-unit assumed latencies (NUAL) if at least one operation has a non-unit assumed latency, L, which is greater than one, i.e., the semantics of the program are correctly understood if exactly the next L−1 instructions are understood to have been issued before this operation completes. An architecture is UAL (NUAL) if the class of programs that it is supposed to execute are UAL (NUAL). We shall use the terms NUAL program and latency-cognizant program interchangeably.

Very Long Instruction Word (VLIW) processors are viewed as an attractive way of achieving instruction-level parallelism because of their ability to issue multiple operations per cycle with relatively simple control logic. Although VLIW architectures offer the advantages of simplicity of design and high issue rates, a major impediment to the use of VLIW and other novel ILP architectures is that they are not compatible with the existing software base. Lack of object code compatibility in VLIW architectures across processors having different hardware latencies and varying levels of parallelism is a severe limit to their adoption as a general purpose computing paradigm. This means that an installed software base of binaries cannot be built around a family of generations. The economic implications of this problem are enormous, and an efficient solution is necessary if VLIW architectures are to succeed. Two classes of approaches to this problem have been reported in the literature: hardware approaches and software approaches. Although these techniques may provide compatibility, they do so at the expense of hardware complexity that can potentially impact cycle time. A typical software approach is to statically recompile the VLIW program from the object file. The approach generates multiple executables, which poses difficulties for commercial copy protection and system administration. For example, if a first generation of a machine has certain latencies involved with each functional unit and the second generation VLIW machine has different latencies involved with those same functional units, the old VLIW schedule cannot be guaranteed to execute properly on the second generation machine due to the flow dependence between the different operations. The same type of problem results if the second generation machine includes an additional functional unit. Even if the latencies remained the same, the code scheduled for this new machine would not execute correctly on the older machines because the scheduler has moved operations in order to take advantage of the additional functional unit. There is no trivial way to adapt this schedule to the older machines. This is the case of downward incompatibility between generations. In this situation, if different generations of the machines share binaries, compatibility requires either a mechanism to adjust the schedule or a different set of binaries for each generation. IBM describes hardware features for an ILP machine called DAISY (Dynamically Architected Instruction Set from Yorktown). DAISY is specifically intended to emulate existing architectures, so that all existing software for an old architecture (including operating system kernel code) runs without changes on the VLIW architecture. Each time a new fragment of code is executed for the first time, the code is translated to VLIW primitives, parallelized and saved in a portion of main memory not visible to the old architecture, by a Virtual Machine Monitor (software) residing in read only memory. Subsequent executions of the same fragment do not require a translation (unless cast out). A limitation of the hardware approaches is that the scope for scheduling is limited to the window of Ops seen at run-time, hence available ILP is relatively less than what can be exploited by a compiler. These schemes may also result in cycle time stretch, a phenomenon of concern when considering the VLIW paradigm over superscalar for future generation machines.

Instruction set architecture is a description of a computer architecture at the level the programmer can observe. A programmer's model of a computer architecture is a similar term. In an exposed-pipeline architecture, the delays associated with pipelined execution of instructions are visible in the instruction set architecture and can be exploited to improve computational bandwidth.

Other techniques of solving the compatibility issues involve migrating the software across to a new machine architecture. In these applications, oftentimes the original old architecture that is trying to be emulated, or the native instruction set architecture of a processor, is called the base architecture. The VLIW which emulates the old architecture, or any instruction set architecture, other than the base architecture of a given processor that will be supported on that processor, is called the migrant architecture.

Code compatibility between current and future generations of exposed pipeline VLIW DSPs is the example of compatibility reflected by this invention. For example, the TI C6000 DSP and the TI 64 bit C6000 DSP extension are the current and future architectures. The TI 64-bit C6000 DSP architecture contains changes in ISA visible pipelining and other architectural features to provide higher operating frequencies. These changes are reconciled with requirements for binary compatibility and a robust code migration path implemented with the invention below.

SUMMARY OF THE INVENTION

A subpipelined translation embodiment providing binary compatibility between current and future generations of DSPs is disclosed. When a fetch packet is retrieved from memory, the entire fetch packet is assigned an operating mode (base instruction set or migrant instruction set) according to the execution mode at the time the request was made to the instruction memory for the fetch packet. The fetch packets from the instruction memory are parsed into execute packets and sorted by execution unit (dispatched) in a datapath shared by both execution modes(base and migrant). Because the fetch packet syntax and execution unit encoding is different between the migrant and base architecture in this case, the two execution modes have separate control logic. Instructions from the dispatch datapath are decoded by either base architecture decode logic or the migrant architecture decode logic, depending on the execution mode bound to the parent fetch packet of the instructions being decoded. Code processed by the migrant and base decode pipelines produces machine words that control the register files and the execution hardware functional units. These machine words are selected with a multiplexer. The choice of the eventual machine word from the multiplexer is governed by the operating mode bound to the fetch packet that produced the machine word and sequencing logic for subpipelined execution. The selected machine word controls a global register file, which supplies operands to all hardware execution units and accepts results of all hardware execution units.

BRIEF DESCRIPTION OF THE DRAWINGS

FIG. 1 illustrates an example of migrant code of a subpipelined execution migrant architecture which has ¼ the instruction latency the of the base architecture.

FIG. 2 illustrates the rescheduling of the migrant code, running in subpipelined execution mode, after translation to the base architecture code, illustrating the inefficiency of the translation.

FIG. 3 illustrates a sub-pipelined translation embodiment according to a preferred embodiment of the invention.

DETAILED DESCRIPTION OF THE PREFERRED EMBODIMENTS

Subpipelined execution is a hardware-efficient method for executing code from a migrant exposed-pipeline architecture. In this method, the base architecture is designed with a fixed multiple (call this S) of the instruction latencies of the desired migrant architecture. With this relationship between the migrant and base architectures, code from the migrant archtecture can be executed on the base architecture by delaying the issue of migrant instructions by S−1 clock cycles. In addition to providing the subpipelined execution mode, facilities are provided to change between base and migrant instruction sets with low overhead.

Given the code illustrated in FIG. 1, and a base architecture with 4 times the instruction latency of the migrant architecture for all instructions, as illustrated in the table below:

TABLE 1

Comparison between migrant and base architecture latencies

| Instruction | Migrant Delay Slots | Migrant Latency | Base Delay Slots | Base Latency |
|---|---|---|---|---|
| ADD | 0 | 1 | 3 | 4 |
| AND | 0 | 1 | 3 | 4 |
| OR | 0 | 1 | 3 | 4 |
| MUL | 1 | 2 | 7 | 8 |

The code can be rescheduled in the base architecture as illustrated in FIG. 2. As is illustrated, because of all the NOPs necessary to make up difference in latencies between the base and migrant codes, the code running in subpipelined execution mode will not exceed a fraction of the performance of the base architecture instruction set. Depending on the performance requirements and other characteristics of the code, two automated approaches are available to enhance the performance of code from the migrant architecture. First code from the migrant architecture can be re-linked with libraries written in the base architecture, and second, off-line binary translation techniques can convert migrant architecture code to base architecture code.

In the case of migrant code with base libraries, the performance gain over the subpipelined case is proportional to the execution time spent in the base libraries and the performance of the library routines in the base ISA. The time spent in libraries varies strongly with applications, but it is not uncommon for greater than 50% of the execution time of an application to be in libraries in the 32-bit C6000 DSP instruction set.

Off-line binary translation takes in binary code from the migrant architecture, reverse-assembles the code and converts it to the base architecture. The conversion process can be implemented in several ways. Conversion is simplified by having the sub-pipelined execution mode: cases that can be recognized as difficult or non-translatable execute in sub-pipelined mode. This allows off-line translation to be deployed incrementally: as the notion of difficult varies over time, the fraction of the code executing in subpipelined mode varies.

Although the previously discussed (in the Background of Invention) IBM solutions and other HP and North Carolina State University solutions on supporting compatibility between generations of VLIW processors may result in VLIW base architectures that can support migrant architectures, these solutions are not appropriate solutions for DSPs. In particular, dynamic translation approaches as described by the IBM and NCSU works fail to provide the run-time predictability required for real-time DSP applications. The method described in the HP work will have complex but deterministic run-time, but substantial hardware costs from the delayed—issue instruction buffer, delay register file and copyback unit.

Work has also been published involving CISC to superscalar RISC translation. Later versions of this same work involves static translation coupled with software simulation of the migrant architecture running on the base architecture. In the present invention, all of the functions of the software simulation of the migrant architecture are replaced with hardware execution in subpipelined mode.

FIG. 3 illustrates a subpipelined translation embodiment according to a preferred embodiment of the invention. In this invention, code is fetched from memory. The instruction memory may be implemented as a directly-addressed RAM or cache. The code in the instruction memory can appear to the programmer to be in the migrant instruction set or in the base instruction set. In an implementation, the code in the instruction memory may be pre-decoded to facilitate later instruction processing. A group of instructions simultaneously retrieved from memory is called a fetch packet. Fetch packets are assigned an operating mode (base instruction set or migrant instruction set) according to the execution mode at the time the request was made to the instruction memory for the fetch packet. This allows for rapid mode transitions.

The fetch packets from the instruction memory are parsed into execute packets that can be scheduled to execute simultaneously and sorted by execution unit (dispatched) in a datapath shared by both execution modes (base and migrant). Because the fetch packet syntax and execution unit encoding is different between the migrant and base architecture in this case, the two execution modes have separate control logic.

Instructions from the dispatch datapath are decoded by either base architecture decode logic or the migrant architecture decode logic, depending on the execution mode bound the parent fetch packet of the instructions being decoded. In the case of exposed-pipeline VLIW instruction sets, the decode logic for the base and migrant architectures primarily translates opcodes to the control signals required to execute the specified instructions on the execution hardware functional units. Because of the relationship defined in this invention with regard to the latencies of the migrant and base instruction sets (the base operations have twice the latency of the migrant operations) and the exposed pipelin characteristics of these instruction sets, instruction decoding techniques that need knowledge of the pipeline depth, instruction graduation and instruction dependencies are not required. This results in reduced hardware and complexity in the instruction decode logic.

Code processed by the migrant and base decode pipelines produces machine words that control the register files and the execution hardware functional units. These machine words are selected with a multiplexer, which can also select a third No-operation instruction choice. The choice of the eventual machine word from the three possibilities is governed by the operating mode bound to the fetch packet that produced the machine word and sequencing logic for sub-pipelined execution.

In the first preferred embodiment of this invention, the selected machine word controls a global register file, which supplies operands to all hardware execution units and accepts results of all hardware execution units. Two hardware pipeline clock cycles later, the selected machine word controls local register files that supply operands to either local execution hardware functional units or neighbor hardware execution functional units. Finally, the selected machine word controls the various types of execution hardware that evaluate functions on the operands to produce the results.

We claim:

1. The structure of a subpipelined translation embodiment providing binary compatibility between a base architecture and migrant architecture of a VLIW architecture comprising:

a VLIW architecture comprising a base architecture and a migrant architecture and having a base execution mode and a migrant execution mode;

an instruction fetch unit for simultaneously fetching from memory a group of a plurality of instructions, each such group forming a fetch packet, said instruction fetch unit assigning each fetch packet an operating mode in dependence upon the execution mode at the time the request was made to the memory for the fetch packet;

a shared datapath by both the base and migrant architectures for parsing said base architecture mode and migrant architecture mode fetch packets into execute packets of instructions within said fetch packet that can be executed simultaneously;

a base architecture control circuit for dispatching execute packet instructions having a base execution mode;

a migrant architecture control circuit for dispatching execute packet instructions having a migrant execution mode;

a base architecture decode connected to said shared datapath and said base architecture control circuit for decoding an execute packet in said base mode and generating a corresponding machine word;

a migrant architecture decode connected to said shared datapath and said migrant architecture control circuit for decoding an execute packet in said migrant mode and generating a corresponding machine word;

a multiplexer having at least three inputs and one machine word output wherein a first input is the machine word output of said migrant architecture decode, a second input is the machine word output of said base architecture decode and a third input receiving a no operation instruction machine word, said multiplexer choosing in dependence upon the operating mode of said fetch packet; and execute hardware connected to said multiplexer for executing execute packet instructions on execution units corresponding to said machine word chosen by said multiplexer.

2. The structure according to claim 1, wherein said machine word also controls registers.

3. The structure according to claim 1, wherein said machine word controls a global register file, which supplies operands to all hardware execution units and accepts results of all hardware execution units.

4. The structure according to claim 3, wherein said machine word controls local register files that supply operands to either local execution hardware functional units or neighbor hardware execution functional units subsequent to said machine word controlling said global register file.

5. The structure according claim 4, wherein said machine word controls the various types of execution hardware that evaluate functions on the operands to produce the results of said hardware execution units subsequent to said machine word controlling said local register files.

6. The structure according to claim 1, wherein the base and migrant architecture decode units translates opcodes to the control signals required to execute the specified instructions on the execution hardware functional units.

7. The structure according to claim 1, and further comprising said migrant architecture control circuit for issuing no-operation instruction to preserve the semantics of the instruction in the migrant architecture due to differences in instruction latencies between the base architecture and the migrant architecture.

8. The structure according to claim 1, wherein said VLIW architecture is a Digital signal Processor (DSP).

9. A method of providing binary compatibility between a base architecture and migrant architecture of a VLIW architecture comprising the steps of:

simultaneously fetching from a memory a group of a plurality of instructions, each such group forming a fetch packet;

assigning each fetch packet an operating mode in dependence upon the execution mode at the time the request was made to the memory for the fetch packet;

parsing said base architecture mode and migrant architecture mode fetch packets into execute packets of instructions within said fetch packet that can be executed simultaneously;

dispatching execute packet instructions having a base execution mode;

dispatching execute packet instructions having a migrant execution mode;

decoding an execute packet in said base mode and generating a corresponding machine word;

decoding an execute packet in said migrant mode and generating a corresponding machine word;

choosing one machine word output, in dependence upon the operating mode of said fetch packet, between the machine word decoded in said migrant mode, the machine word decoded in said base mode and a no operation machine word;

controlling the execution hardware units with said chosen machine word.

10. The method according to claim 9, and further comprising controlling registers with said machine word.

11. The method according to claim 9, and further comprising controlling a global register file with said machine word, which supplies operands to all hardware execution units and accepts results of all hardware execution units.

12. The structure according to claim 11, and further comprising controlling local register files that supply operands to either local execution hardware functional units or neighbor hardware execution functional units subsequent to said controlling said global register file.

13. The method according claim 12, and further comprising controlling the various types of execution hardware that evaluate functions on the operands to produce the results of said hardware execution units subsequent to controlling said local register files.

14. The method according to claim 9, and further comprising translating opcodes to the control signals required to execute the specified instructions on the execution hardware functional units within the base and migrant architecture decode units.

15. The method according to claim 9, wherein said VLIW architecture is a Digital Signal Processor (DSP).

16. The method according to claim 9 and further comprising the step of issuing no-operation instruction to preserve the semantics of the instructions in the migrant architecture due to differences in instruction latencies between the base architecture and the migrant architecture.

17. The structure of a subpipelined translation embodiment providing binary compatibility between a base architecture and migrant architecture of a VLIW architecture comprising:

a VLIW architecture comprising a base architecture and a migrant architecture and having a base execution mode and a migrant execution mode;

an instruction fetch unit for simultaneously fetching from memory a group of a plurality of instructions, each such group forming a fetch packet, said instruction fetch unit assigning each fetch packet having an operating mode in dependence upon the execution mode at the time the request was made to the memory for the fetch packet;

a shared datapath by both the base and migrant architectures for parsing said base architecture mode and migrant architecture mode fetch packets into execute packets of instructions within said fetch packet that can be executed simultaneously;

a base architecture control circuit for dispatching execute packet instructions having a base execution mode;

a migrant architecture control circuit for dispatching execute packet instructions having a migrant execution mode, said migrant architecture control circuit issuing a no-operation instruction to preserve the semantics of the instruction in the migrant architecture due to differences in instruction latencies between the base architecture and the migrant architecture;

a base architecture decode connected to said shared datapath and said base architecture control circuit for decoding an execute packet in said base mode and generating a corresponding machine word;

a migrant architecture decode connected to said shared datapath and said migrant architecture control circuit for decoding an execute packet in said migrant mode and generating a corresponding machine word;

a multiplexer having at least two inputs and one machine word output wherein a first input is the machine word output of said migrant architecture decode and a second input is the machine word output of said base architecture decode, said multiplexer choosing in dependence upon the operating mode of said fetch packet; and execute hardware connected to said multiplexer for executing execute packet instructions on execution units corresponding to said machine word chosen by said multiplexer.

18. The structure according to claim 17, wherein said machine word also controls registers.

19. The structure according to claim 17, wherein said machine word controls a global register file, which supplies operands to all hardware execution units and accepts results of all hardware execution units.

20. The structure according to claim 19, wherein said machine word controls local register files that supply operands to either local execution hardware functional units or neighbor hardware execution functional units subsequent to said machine word controlling said global register file.

21. The structure according claim 20, wherein said machine word controls the various types of execution hardware that evaluate functions on the operands to produce the results of said hardware execution units subsequent to said machine word controlling said local register files.

22. The structure according to claim 17, wherein the base and migrant architecture decode units translates opcodes to the control signals required to execute the specified instructions on the execution hardware functional units.

23. The structure according to claim 17, wherein said VLIW architecture is a Digital signal Processor (DSP).

24. A method of providing binary compatibility between a base architecture and migrant architecture of a VLIW architecture comprising the steps of:

simultaneously fetching from a memory a group of a plurality of instructions, each such group forming a fetch packet;

assigning each fetch packet an operating mode in dependence upon the execution mode at the time the request was made to the memory for the fetch packet;

parsing said base architecture mode and migrant architecture mode fetch packets into execute packets of instructions within said fetch packet that can be executed simultaneously;

dispatching execute packet instructions having a base execution mode;

dispatching execute packet instructions having a migrant execution mode;

decoding an execute packet in said base mode and generating a corresponding machine word;

decoding an execute packet in said migrant mode and generating a corresponding machine word;

issuing a no-operation instruction to preserve the semantics of the instructions in the migrant architecture due to differences in instruction latencies between the base architecture and the migrant architecture;

choosing one machine word output, in dependence upon the operating mode of said fetch packet, between the machine word decoded in said migrant modem the machine word decoded in said base mode and the no-operation instruction issued to preserve the semantics of the instructions in the migrant architecture;

controlling the execution hardware units with said chosen machine word.

25. The method according to claim 24, and further comprising controlling registers with said machine word.

26. The method according to claim 24, and further comprising controlling a global register file with said machine word, which supplies operands to all hardware execution units and accepts results of all hardware execution units.

27. The structure according to claim 26, and further comprising controlling local register files that supply operands to either local execution hardware functional units or neighbor hardware execution functional units subsequent to said controlling said global register file.

28. The method according claim 27, and further comprising controlling the various types of execution hardware that evaluate functions on the operands to produce the results of said hardware execution units subsequent to controlling said local register files.

29. The method according to claim 24, and further comprising translating opcodes to the control signals required to execute the specified instructions on the execution hardware functional units within the base and migrant architecture decode units.

30. The method according to claim 24, wherein said VLIW architecture is a Digital Signal Processor (DSP).

* * * * *